(12) United States Patent
Ramdasi et al.

(10) Patent No.: US 12,455,855 B2
(45) Date of Patent: Oct. 28, 2025

(54) PREFIX PROBE FOR CURSOR OPERATIONS ASSOCIATED WITH A KEY-VALUE DATABASE SYSTEM

(71) Applicant: Micron Technology, Inc., Boise, ID (US)

(72) Inventors: Gaurav Sanjay Ramdasi, Pune (IN); Neelima Premsankar, Austin, TX (US); David Boles, Autsin, TX (US)

(73) Assignee: Micron Technology, Inc., Boise, ID (US)

(*) Notice: Subject to any disclaimer, the term of this patent is extended or adjusted under 35 U.S.C. 154(b) by 335 days.

(21) Appl. No.: 16/947,729

(22) Filed: Aug. 13, 2020

(65) Prior Publication Data

US 2022/0050807 A1 Feb. 17, 2022

(51) Int. Cl.
*G06F 16/14* (2019.01)
*G06F 7/24* (2006.01)
*G06F 16/13* (2019.01)
*G06F 16/16* (2019.01)
*G06F 16/17* (2019.01)

(52) U.S. Cl.
CPC ........... *G06F 16/144* (2019.01); *G06F 7/24* (2013.01); *G06F 16/137* (2019.01); *G06F 16/152* (2019.01); *G06F 16/156* (2019.01); *G06F 16/162* (2019.01); *G06F 16/1734* (2019.01)

(58) Field of Classification Search
CPC ........ G06F 16/144; G06F 7/24; G06F 16/137; G06F 16/152; G06F 16/156; G06F 16/162; G06F 16/1734; G06F 16/28; G06F 16/22

USPC .......................................................... 707/705
See application file for complete search history.

(56) References Cited

U.S. PATENT DOCUMENTS

| | | | | |
|---|---|---|---|---|
| 5,918,224 | A * | 6/1999 | Bredenberg | G06F 12/0815 |
| 7,352,739 | B1 * | 4/2008 | Rangarajan | H04L 45/00 370/256 |
| 8,886,677 | B1 * | 11/2014 | Depelteau | G06F 16/2246 707/797 |
| 8,996,531 | B1 * | 3/2015 | Sacco | G06F 16/40 707/742 |
| 9,565,209 | B1 * | 2/2017 | Grzonkowski | H04L 51/046 |
| 10,810,258 | B1 * | 10/2020 | Niewiadomski | G06F 16/9027 |

(Continued)

OTHER PUBLICATIONS

Alsubaiee, Storage Management in AsterixDB, 2014, 40th International Conference on Very Large Data Bases, vol. 7, No. 10, p. 842-844 (Year: 2014).*

*Primary Examiner* — Pierre Vital
*Assistant Examiner* — Andrew N Ho
(74) *Attorney, Agent, or Firm* — Lowenstein Sandler LLP

(57) ABSTRACT

A prefix probe component receives a request to perform a cursor operation to search for one or more data elements of a key-value data store, the request comprising a key identifier associated with the one or more data elements, and wherein the key-value data store comprises a tree structure with a plurality of nodes; traverses a portion of the plurality of nodes to identify data elements in the key-value data store that match the key identifier; determines whether a number of the data elements that match the key identifier satisfies a threshold condition; and responsive to determining that the number of data elements satisfies the threshold condition, performs the cursor operation for the data elements that match the key identifier.

17 Claims, 5 Drawing Sheets

(56) References Cited

U.S. PATENT DOCUMENTS

| | | | | |
|---|---|---|---|---|
| 2007/0260595 | A1* | 11/2007 | Beatty | G06F 16/322 |
| | | | | 707/999.005 |
| 2009/0063400 | A1* | 3/2009 | Borkar | G06F 16/81 |
| 2009/0228528 | A1* | 9/2009 | Ercegovac | G06F 16/319 |
| | | | | 707/999.203 |
| 2012/0278335 | A1* | 11/2012 | Bentkofsky | G06F 16/2246 |
| | | | | 707/743 |
| 2013/0218899 | A1* | 8/2013 | Raghavan | G06F 16/9024 |
| | | | | 707/E17.083 |
| 2013/0268770 | A1* | 10/2013 | Hunt | G06F 16/2255 |
| | | | | 713/189 |
| 2014/0325115 | A1* | 10/2014 | Ramsundar | G06F 3/0688 |
| | | | | 711/163 |
| 2014/0337362 | A1* | 11/2014 | Goldstein | G06F 16/217 |
| | | | | 707/752 |
| 2015/0220596 | A1* | 8/2015 | Purcell | G06F 16/2228 |
| | | | | 707/715 |
| 2015/0324485 | A1* | 11/2015 | Tsirkin | G06F 16/951 |
| | | | | 707/769 |
| 2015/0370860 | A1* | 12/2015 | Bender | G06F 16/258 |
| | | | | 707/693 |
| 2016/0026652 | A1* | 1/2016 | Zheng | G06F 16/137 |
| | | | | 707/692 |
| 2017/0212680 | A1* | 7/2017 | Waghulde | G06F 3/0616 |
| 2018/0373727 | A1* | 12/2018 | Ding | G06F 16/1727 |
| 2019/0340379 | A1* | 11/2019 | Beecham | H04L 9/3239 |

\* cited by examiner

PREFIX PROBE FOR CURSOR OPERATIONS ASSOCIATED WITH A KEY-VALUE DATABASE SYSTEM

TECHNICAL FIELD

The present disclosure generally relates to a memory sub-system, and more specifically, relates to performing a prefix probe for cursor operations associated with a key-value database system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
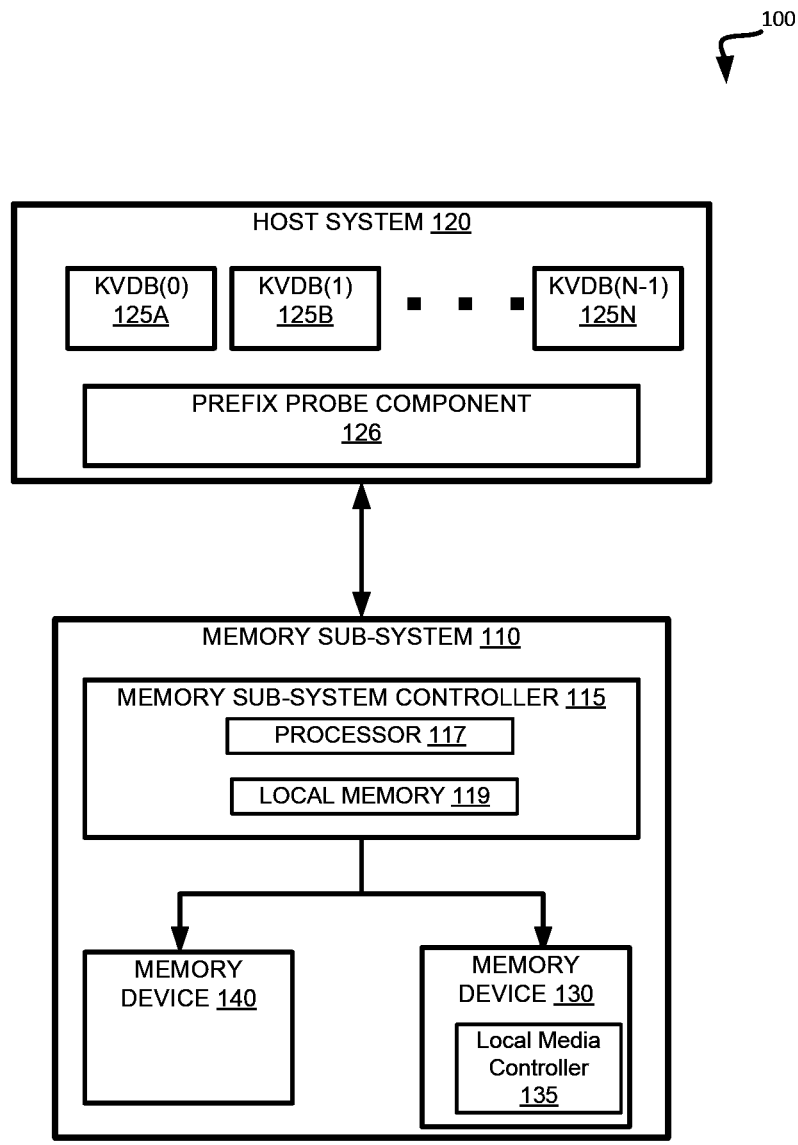
FIG. 1 illustrates an example computing system that includes a host system coupled with a memory sub-system in accordance with some embodiments of the present disclosure.

Aspects of the present disclosure are directed to performing a prefix probe for cursor operations in a storage architecture based on a type of non-relational database, such as a key-value database (KVDB). A KVDB is an instance of a collection of key-value stores (KVSs) in a host system coupled to a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

Key-value data structures accept a key-value pair (i.e., including a key and a value) and are configured to respond to queries pertaining to the key. Key-value data structures can include such structures as dictionaries (e.g., maps, hash maps, etc.) in which the key is stored in a list that links (or contains) the respective value. While these data structures are useful in-memory (e.g., in main or system state memory as opposed to long-term storage), storage representations of these data structures in persistent storage (e.g., long-term on-disk storage) can be inefficient.

Certain KVSs use a tree data structure (such as, log-structured merge-tree or LSM tree) to increase efficiency in persistent storage architecture. A tree data structure includes nodes with connections between a parent node and a child node based on a predetermined derivation of a key. The nodes include temporally ordered sequences of KV-sets. The KV-sets contain key-value pairs in a key-sorted structure. KV-sets are also immutable once written. The KVS tree achieves high write-throughput and improved searching by maintaining KV-sets in nodes. The KV-sets include sorted keys, as well as, in an example, key metrics (such as bloom filters, minimum and maximum keys, etc.), to provide efficient search. In many examples, KVS trees can improve upon the temporary storage issues of other types of tree structures by separating keys from values and merging smaller KV-set collections. Additionally, the KVS trees can reduce write amplification through a variety of maintenance operations on KV-sets. Further, as the KV-sets in nodes are immutable, issues such as write wear on persistent storage devices (e.g., solid state devices (SSDs)) can be managed by the data structure, reducing garbage collection activities of the device itself. This has the added benefit of freeing up internal device resources (e.g., bus bandwidth, processing cycles, etc.) that result in better external drive performance (e.g., read or write speed).

KVDB implementations that include KVS trees do not typically update or delete records in place. An update operation inserts a new data record (a key and a value) along with a timestamp. A delete operation inserts a data marker that includes a key record without any data that indicates that a value corresponding to the key has been deleted. This marker is typically referred to as a "tombstone" record. Typically, a tombstone can be represented as a key entry and no value-block space will be consumed for that key-value pair. The purpose of the tombstone is to mark the deletion of the value while avoiding the possibly expensive operation of purging the value from the tree. In such instances, when a temporally ordered search encounters a tombstone, this indicates that the corresponding value has been deleted even if an older version of the key-value pair resides at an older location (e.g., at an older timestamp) within the tree.

Conventional systems that are configured with KVS trees typically store data such that each node in the tree structure stores a list of sorted collections within the node. This structure, while providing efficiencies for storing data on persistent storage devices, can result in significant inefficiencies when attempting to retrieve the data from the data store. Since multiple writes and rewrites of data with the same key cause new data records to be written (with associated tombstone records for the deleted data elements), the data can be spread across multiple nodes within the tree. In such cases, retrieving data for a single key value can involve traversing multiple tree nodes and creating a globally sorted collection of that data (e.g., performing a "merge sort" of the collections for all of the nodes). This process can be very expensive both in terms of processing time as well as system resources (e.g., memory, processor cycles, processor power consumption, etc.).

When a query is received to retrieve data from the data store, the request is typically applied against main (or root) node using a cursor operation. A database cursor is a control structure that enables traversal over the records in a database. Cursors can facilitate subsequent additional processing such as retrieval, addition and removal of database records. A cursor can be used by an application program to process individual rows returned by database system queries. Additionally, a cursor can allow manipulation of entire result sets at once, which can enable the sequential processing of rows in a result set. Performing a cursor operation to search for data in a KVS data store involves performing the merge sort process using any associated child nodes where data that matches the search request can be stored within the tree structure.

Performing cursor operations provides accurate return results for KVS data stores configured with non-unique indexes. In other words, in a data store where multiple valid records can be stored with the same index key value (e.g., a person's last name, a street name, a city, a state, etc.), a cursor operation, while expensive, can provide the desired return results for the query. This configuration, however, becomes significantly more expensive and less efficient in instances where the search query is expecting only a single or small number of records returned. In other words, although the data store can be configured with a non-unique index, occasionally the data actually stored assumes that the index is unique. For example, a KVS data store can be configured with a non-unique index that uses a value for a United States Social Security Number (SSN) as the key. Since an SSN is a unique value, there would typically be one entry in the data store for each unique value for an SSN. Executing a cursor operation in such instances would lead to a significant increase in resource usage for every query.

Aspects of the present disclosure address the above and other deficiencies by implementing a prefix probe component that can be used to reduce the number of cursor operations performed for key-value data stores. The prefix probe component can receive a request to execute a cursor operation to search for data that matches a specified search key, and prior to executing the cursor operation, can "probe" the KVS tree structure by traversing the nodes of the tree to determine the number of data elements in the data store that match the specified search key. A threshold number of matching data elements can be established to control when an actual cursor operation (and associated merge sort) is performed. If the number of valid data elements satisfies a threshold condition (e.g., meets or exceeds the predetermined threshold), the prefix probe component can perform the cursor operation and return the results in response to the request. If, however, the number of matching data elements does not satisfy the threshold condition (e.g., is below the predetermined threshold, such as if there are zero matches or a single matching data element), the prefix probe component can provide a response to the request without performing the resource intensive and unnecessary cursor operation.

Advantages of the present disclosure include, but are not limited to, significantly improved throughput performance for queries against KVS data stores that are configured with non-unique indices but are implemented for storing data with unique keys. Implementing the prefix probe component of the present disclosure can perform the less intensive probe operation to regulate when a cursor and associated merge sort are actually performed, which can significantly reduce the resources necessary for processing query requests. Additionally, since the performance of the query process for the KVS data store is improved, the performance of a memory sub-system that includes the KVS data store also improves, since fewer resources are used to perform the query.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and a cross-point array of non-volatile memory cells.

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA) namespace) and a physical address and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The host system 120 can include one or more instances of KVDBs 125A to 125N. The host system 120 can also include a prefix probe component 126 that can perform a prefix probe of the KVDBs to determine whether to execute a cursor operation based on a received query request. The controller 115 can include a processor 117 (processing device) configured to execute instructions stored in local memory 119 for performing some of the operations described herein. In some implementations, Host system 120 can include at least a prefix probe component 126. For example, the host system can include a processor (e.g., a processing device) configured to execute instructions stored in a local memory of the host system 120 for performing the operations described herein. In some embodiments the prefix probe component 126 is part of the host system 120, an application, or an operating system. In some implementations, the memory sub-system controller 115 includes at least a portion of the prefix probe component 126.

The prefix probe component 126 can receive a request to perform a cursor operation to search for data elements of a key-value data store configured as a KVS tree structure (e.g., KVDB 125A-125N). In various implementations, the request can include a search key identifier that can be used to target the search for the requested data. The prefix probe component 126 can then probe the KVS tree to determine the number of stored data elements that match the search key specified in the request, and if that number satisfies a threshold condition, the prefix probe component 126 can perform the cursor operation to retrieve the matching data. Otherwise, the prefix probe component can provide a response to the request that simulates the results of a cursor operation without performing the actual cursor operation, and accordingly, without expending the resources typically expended by a cursor operation. Further details with regards to the operations of the prefix probe component 126 are described below.

Figure 2:
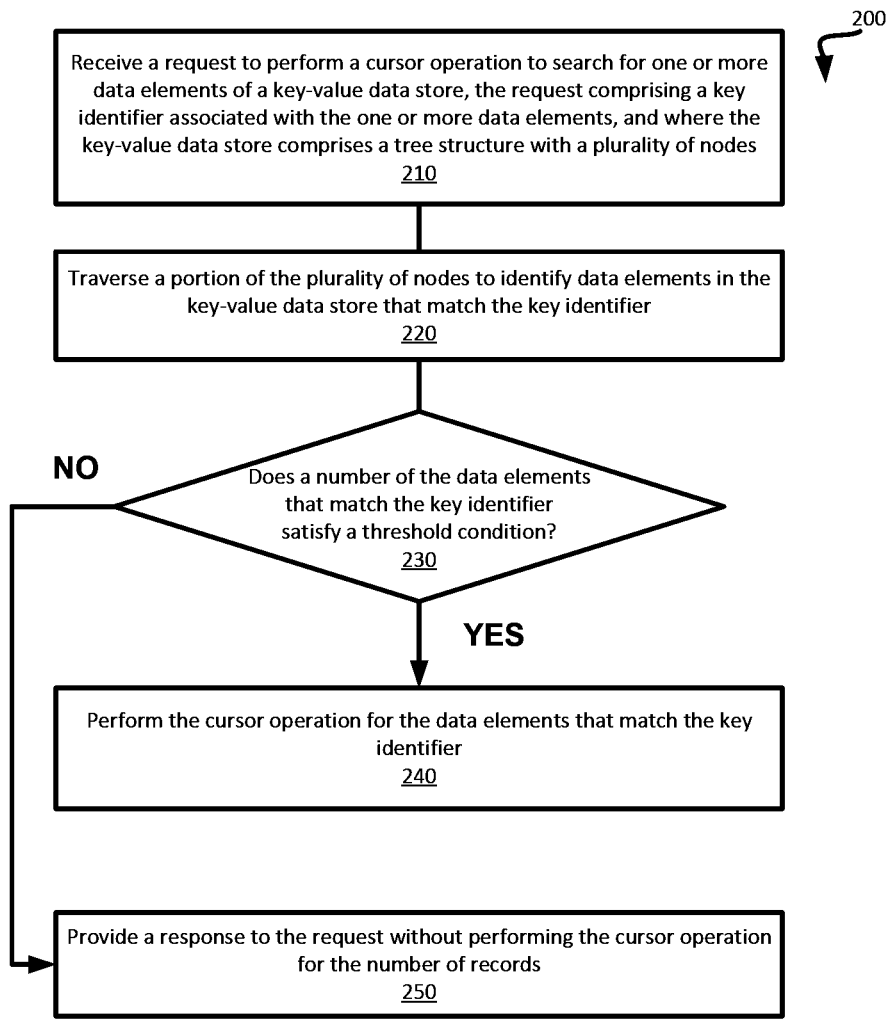
FIG. 2 is a flow diagram of an example method to perform a prefix probe of a key-value data store, in accordance with some embodiments of the present disclosure.

FIG. 2 is a flow diagram of an example method 200 to perform a prefix probe of a key-value data store in accordance with some embodiments. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the prefix component 126 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, at operation 210, the processing logic receives a request to perform a cursor operation to search for one or more data elements of a key-value data store (e.g., KVDB 125A-N of FIG. 1). As noted above the key-value data store can be configured as a tree structure with multiple nodes, where each node can store a collection of key-value sets (KV-sets). As noted above, the tree structure can be configured such that each node is associated with a hash value of a particular portion of the index associated with the key-value data store. In some implementations, the first group of levels/layers in the tree can be configured such that each node can be associated with a hash value of a portion of the tree index (e.g., a prefix value). At a threshold level/layer of the tree (e.g., the pivot level/layer), the nodes of any subsequent level/layer (e.g., child/grandchild nodes) can be configured such that they are associated with a hash value of a greater portion of the tree index (e.g., a "soft" prefix). For example, the first group of levels/layers of the tree can be associated with a hash value of the first 4 bytes of the tree index. Any additional child levels/layers of the tree can be associated with a hash value of the first 10 bytes of the tree index. In other implementations, other hash value combinations can be used.

In various implementations, the request can include a search key identifier, or a portion of a search key (e.g., a search key prefix) associated with the data elements that are the target of the request. For example, the search key can include a number of bytes that is analogous to the soft prefix of the key index of the tree structure for the key-value data store. Using the example above, the key identifier received in the request can include a 10 byte value. In other implementations, other sizes for the search key identifier can be used.

At operation 220, the processing logic traverses a portion of the nodes in the tree structure to identify data elements in the key-value data store that match the key identifier received in the request. In various implementations, the processing logic can traverse the tree structure based on hash values for portions of the received search key identifier based on the layer of the tree structure being analyzed. As noted above, processing logic can traverse the initial levels/layers of the tree structure based on a hash value of a portion of the received key identifier (e.g., a search key prefix). In such instances, the processing logic can determine a first hash value of this first portion of the key identifier, and select a node from the multiple nodes of the tree based on this first hash value. The processing logic can then determine whether any of the data collections (e.g., KV-sets) of that node include data elements that match the received search key identifier.

In various implementations, a data element can match the received search key identifier when the values of the bytes of the data element(s) stored in the data collections of a node are the same as the values of the bytes of the received search key identifier. For example, if a received search key identifier specifies a request to search for a U.S. Social Security Number '123456789', the processing logic would traverse the nodes to identify the data elements stored in the nodes of the tree structure that have the value '123456789' in the appropriate social security number field of the key-value data store. In other implementations, the received search key identifier can be shorter (e.g., can contain a fewer number of byte values) than the field to which it is compared. To continue with the social security example, the received search key can be the first three bytes of the nine byte social security number. The processing logic could then identify the stored data elements with the first three bytes of the social security number field that are equal to the received search key.

The processing logic can maintain a counter of the number of data elements that match the key identifier as the tree is traversed. In some implementations, when a data element matching the key identifier is identified, the processing logic can increment the counter. In one embodiment, the KV-set records in each node of the tree are traversed temporally, such that the most recent keys are examined first and earlier keys are examined later. Thus, the processing logic can encounter a tombstone while traversing the records of a node prior to a valid data element associated with the tombstone. In one embodiment, the processing logic maintains a list or other indication of tombstones that have been encountered while traversing the records of a node and determines whether any subsequently encountered valid data elements are associated with any previously encountered tombstones. If so, the processing logic does not increment the counter upon identifying a valid data element that matches the key identifier, but which is also associated with a previously encountered tombstone (since that apparently valid data element was actually marked as deleted at a later time). In another embodiment, the processing logic can encounter duplicate data elements while traversing records of a node. For example, the processing logic can compare subsequently encountered data elements to previously encountered data elements to determine if there is a match. Upon determining that a certain data element that matches the key identifier matches a previously encountered data element, and thus that the counter was previously incremented on behalf of that data element, the processing logic does not increment the counter an additional time. Once the KV-sets in the selected node have been examined, the processing logic can proceed to operation 230 to then determine whether to perform a cursor operation or proceed to a child node of the selected node to continue traversing the tree.

At operation 230, the processing logic determines whether the number of data elements that match the key identifier satisfies a threshold condition. In various implementations, the processing logic makes this determination based on the number of valid data elements that match the search key identifier. In other words, the processing logic determines the number of data elements identified that have not been deleted (e.g., the data elements that do not have an associated tombstone). In some implementations, this determination can be made by comparing the counter to a predetermined threshold number. If the number of data elements is greater than or equal to the threshold number, this can indicate that the threshold condition is satisfied and that a cursor operation should be performed to retrieve the data elements. For example, if two or more matching data elements are identified, this can indicate that a cursor operation should be performed to create a sorted result set across the key-value data store. In such instances, the threshold condition can be set to two. In other implementations, higher or lower threshold conditions can be used. Responsive to determining that the number of data elements satisfies the threshold condition, processing continues to operation 240, where the processing logic performs the cursor operation for the data elements that match the key identifier.

At operation 240, processing logic can perform the cursor operation by creating a new global sort order for the matching data elements at that moment in time over the entire key-value data store. In such instances, the processing logic can perform a merge sort operation to collect the valid data elements and any associated tombstone records to generate a single globally sorted data element collection. The processing logic can sort the data elements that match the received search key identifier to create a sorted collection of data elements, identify a portion of the sorted collection of data elements associated with deleted data elements (e.g., data elements that have an associated tombstone record), and remove those deleted data elements from the sorted collection. The processing logic can then use the resulting sorted collection to provide the results to the request.

At operation 230, responsive to determining that the number of data elements does not satisfy the threshold condition (i.e., is less than the threshold number), the processing logic can continue traversing the tree to determine if there are any matching data elements in any of the child nodes of the currently examined node. In various implementations, at each node, processing logic can determine whether the selected node includes any data elements that match the key identifier, and responsive to determining that the selected node does not include any matching data elements, selecting an additional node in the tree. Additionally, or alternatively, processing logic can select an additional node in the tree if matching data elements were found in the current node, but the threshold condition was not satisfied. For example, if the threshold condition is set to two matching data elements, and only one was found in the current node, then the tree traversal process can continue.

As noted above, the tree can be structured with a first set of nodes that store data based on a hash value of a first portion of the index (e.g., the prefix), and a second set of nodes that store data based on a hash value of a second portion of the index (e.g., the soft prefix). As the tree traversal process continues through additional nodes, the processing logic can select the hash value to use based on the node layer/level of the tree. The processing logic can determine whether the currently selected node is associated with a threshold node level, and if so, select the appropriate portion of the search key value to generate the hash for selecting the additional tree node. Responsive to determining that the current node is associated with the threshold node layer/level, processing logic can determine the hash value of the second portion of the key identifier. The processing logic can then identify the next node in the tree to analyze based on the newly generated hash value. At each subsequent node in the tree the processing logic can determine whether the number of matching data elements satisfies the threshold condition. If so, processing proceeds to operation 240 to perform the cursor operation. Otherwise, the above process is repeated to select the next node in the tree based on the hash value of the appropriate portion of the search key value received in the request. An illustrative example of tree traversal is described below with respect to FIG. 3.

In various implementations, if the entire tree has been traversed and the number of matching data elements has not satisfied the threshold condition, processing proceeds to operation 250, where the processing logic provides a response to the request without performing the cursor operation for the number of records. In some implementations, processing logic determines whether any data elements in the key-value data store match the search key identifier. Responsive to determining that no data elements match the search key identifier, processing logic can provide a response to the request that indicates that no matches were found (e.g., an "end of file" condition). Responsive to determining that at least one matching data element was identified (but not enough to satisfy the threshold condition), the processing logic can provide a response to the request where the response includes the matching data element(s). In such instances the processing logic simulates the performance of the requested cursor operation without involving the resources typically involved in actually performing the cursor operation.

Figure 3:
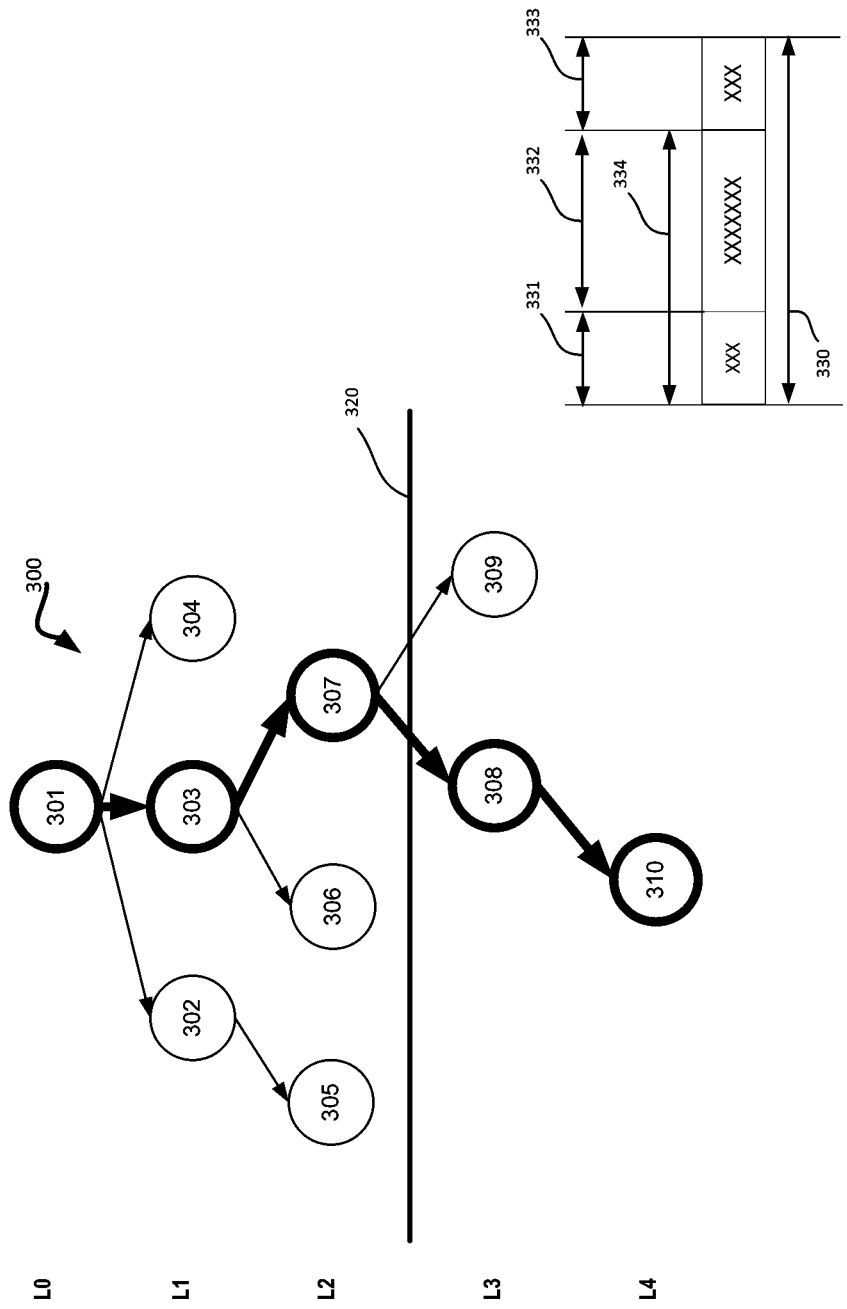
FIG. 3 illustrates an example of executing a prefix probe operation for a key-value data store based on a received request to perform a cursor operation, in accordance with some embodiments of the present disclosure.

FIG. 3 illustrates an example of executing a prefix probe operation for a key-value data store based on a received request to perform a cursor operation, in accordance with some embodiments of the present disclosure. In some embodiments, this process can be performed by the prefix probe component 126 of FIG. 1.

As shown in FIG. 3, a key-value data store is configured in a tree structure 300, where the tree structure includes multiple layers L0-L4, and where each layer of tree structure 300 includes one or more nodes. Tree structure 300 can be configured such that one set of nodes store data based on a hash value of one portion of the tree index and a second set of nodes that store data based on a hash value of a second larger portion of the tree index. As shown, threshold layer 320 is set to signify that nodes in layers L1 (nodes 302, 303, 304) and L2 (nodes 305, 306, 307) are configured to store data based on one hash value, and nodes in layers L3 (nodes 308, 309) and L4 (node 310) are configured to store data based on another hash value.

Index 330 depicts an example layout for the index used in configuring the tree structure 300. Index 330 includes three portions: a prefix 331, a secondary portion 332, and a suffix 333. In various implementations, more or fewer portions of the index can be used to configure the tree 300 depending on the type of data being stored. Additionally, while a particular size of each portion of the index is depicted in index 330, in other implementations, other sizes for the various index portions can be implemented. As shown, nodes for the layers above threshold 320 can be configured to store data based on a hash value associated with prefix 331 of index 330. Additionally, nodes for the layers L3 and L4 can be configured to store data based on a hash value associated with a combination of prefix 331 and secondary portion 332 (depicted as "soft prefix" 334). By configuring a soft prefix length appropriately, the prefix probe component can traverse only one path down the tree to determine whether or not to perform a cursor operation. For example if an individual's 9-digit SSN is used as a non-unique index, the soft prefix length can be configured to include all 9 digits of the SSN, allowing the prefix probe component to perform a prefix probe operation when a query for a particular SSN is received. To perform this prefix probe operation, the prefix probe component need only traverse one path of the tree structure 300 to determine if multiple entries for an SSN exist (which is unlikely). Since the SSN would be in secondary portion 332, and the hash value is computed on the soft prefix 334 (as opposed to the full index 330), the soft prefix will be unique as long as the SSN is unique, and only one path (e.g., nodes 301, 303, 307, 308, 310 shown in bold in FIG. 3) need be traversed to look for the SSN. Above threshold 320, the hash of prefix 331 is used, regardless of whether the soft prefix 334 is defined or not. Once below threshold 320, without soft prefix 334, each node in tree structure 300 would need to be examined, adding additional latency and resource utilization to the process.

L0 includes the main node (e.g., the root node) 301. In various implementations, when new data is written to the key-value data store, it is initially written to node 301, and once a sufficient number of records have been written to the KV-sets for that node, the data can be pushed down (e.g., spilled over) into one of the child nodes in L1 (e.g., one of nodes 302, 303, or 304) based on the hash value for the portion of the data element associated with prefix 331. Similarly, once the KV-sets for any of the nodes in L1 become full, the data can be pushed down into the appropriate child nodes of L2. Since the nodes of L2 are associated with the threshold layer 320, any additional spill over into layers L3 and L4 can be performed based on the hash value for the portion of the data element associated with soft prefix 334.

As described above with respect to FIG. 2, the prefix probe component can receive a request to perform a cursor operation to search for data elements in tree 300. The request can include a key identifier that corresponds to a portion of the index 300 used to configure tree 300. The prefix probe component can then traverse tree 300 to identify data elements in the key-value data store that match the key identifier received in the request. As shown, the prefix probe component can select node 303 based on the hash value of the portion of the key identifier that corresponds to prefix 331 of the tree index. The prefix probe component can then inspect the KV-sets of node 303 to determine if there are any data elements stored at that node that match the received key identifier. If so, and if neither a tombstone nor a duplicate data element was previously encountered, the prefix probe component can increment a counter that tracks the number of matching data elements in the tree.

If no matching data elements are found at node 303, or if the number of matching data elements is insufficient to satisfy the threshold condition, the prefix probe component can identify a child node of node 303 in L2 based on the hash value. As shown in the example of FIG. 3, node 307 in L2 is selected and the process is repeated to determine whether there are any matching data elements in the KV-sets stored at node 307. As noted above, since the nodes of L2 are associated with threshold layer 320, any subsequent traversal of tree 300 would utilize a hash value of the portion of the received key identifier that is associated with the soft prefix 334. Thus, in the depicted example, the traversal path would proceed to node 308 of L3, then node 310 of L4 should the threshold number of matching data elements not be satisfied during the traversal process.

During the traversal process, if the prefix probe component identifies the threshold number of matching data elements, the prefix probe component can bypass examining any additional nodes of the tree and initiate performance of the cursor operation to construct a globally sorted data collection for the matching data elements.

Figure 4:
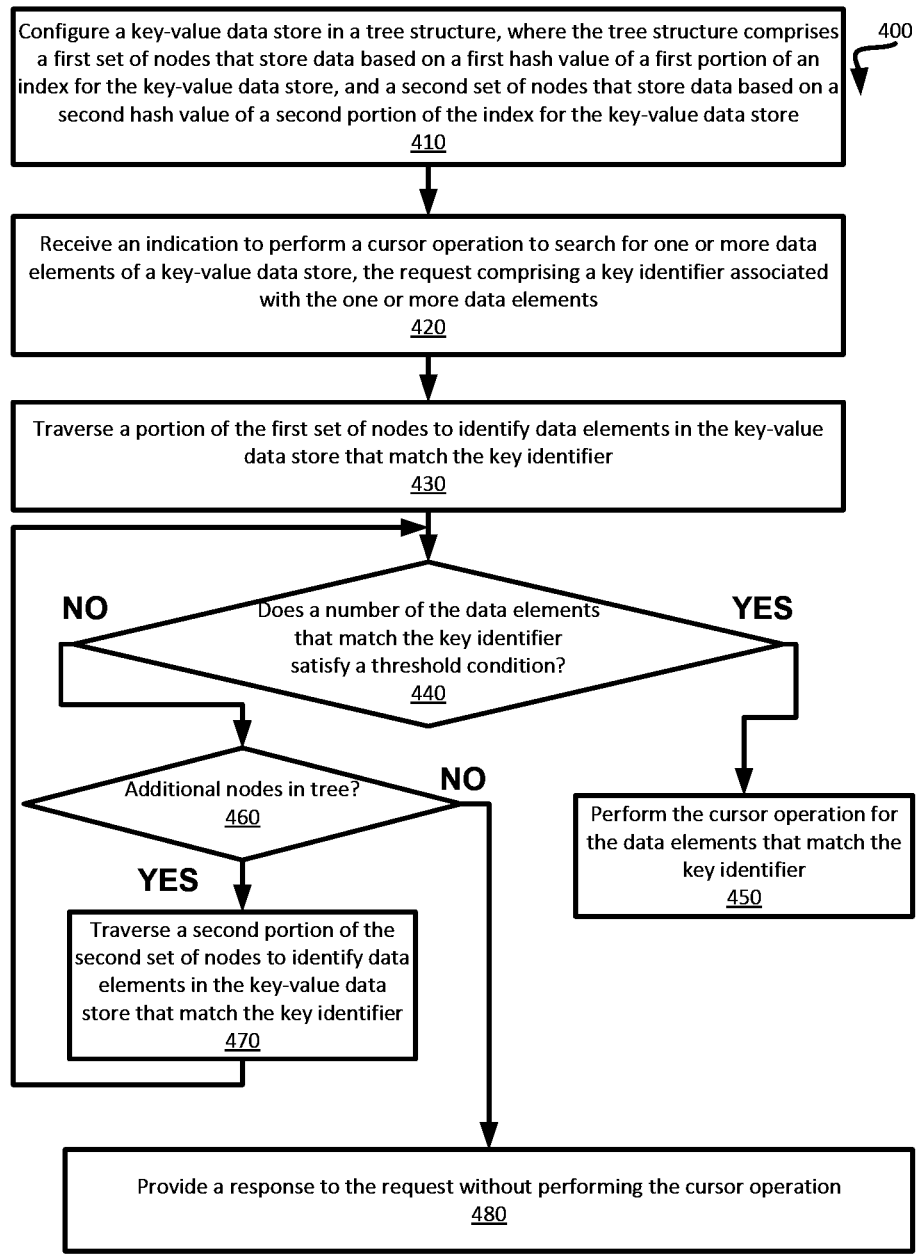
FIG. 4 is a flow diagram of an example method to configure a tree structure for a key-value data store and perform a prefix probe of the tree structure, in accordance with some embodiments of the present disclosure.

FIG. 4 is a flow diagram of an example method 400 to configure a tree structure for a key-value data store and perform a prefix probe of the tree structure in accordance with some embodiments. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the prefix component 126 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 4, at operation 410, the processing logic configures a key-value data store in a tree structure, where the tree structure includes a first set of nodes that store data based on a first hash value of a first portion of an index for the key-value data store, and a second set of nodes that store data based on a second hash value of a second portion of the index for the key-value data store. An example tree structure is described above with respect to FIG. 3. At operation 420, the processing logic receives a request to perform a cursor operation to search for one or more data elements of the key-value data store. In various implementations, the request can include a search key identifier associated with the one or more data elements that are the target of the search.

At operation 430, the processing logic traverses a portion of the first set of nodes in the tree to identify data elements in the key-value data store that match the key identifier. As noted above, the processing logic can traverse the tree by first determining the first hash value for a first portion of the key identifier (e.g., a hash of the key identifier associated with the prefix of the tree index). Subsequently, the processing logic can select a node from the first set of nodes based on the first hash value, and determine whether there are any data elements stored in first node (e.g., in the KV-sets of the first node) that match the key identifier. If not, the processing logic can select an additional node of the tree and repeat the process.

At operation 440, the processing logic determines whether the number of data elements that match the key identifier received at operation 420 satisfy a threshold condition. In some implementations, this determination is made by maintaining a counter and incrementing that counter as described above with respect to FIG. 2. If so, processing proceeds to operation 450 where processing logic performs a cursor operation for the data elements that match the received key identifier. In various implementations, the cursor operation is performed as described above with respect to FIG. 2.

If at operation 440, processing logic determines that the number of data elements that match the received key identifier does not satisfy the threshold condition, processing proceeds to operation 460. At operation 460, the processing logic determines whether there are any additional nodes remaining in the tree structure. If so, processing continues to operation 470 where the processing logic traverses a second portion of the second set of nodes to identify data elements in the key-value data store that match the key identifier. As noted above, in various implementations, the processing logic can perform the additional tree traversal by determining whether the currently selected node of the tree is associated with a threshold node level of the tree structure. Responsive to determining that the current node is associated with the threshold node level, the processing logic can determine the second hash value for the second portion of the key identifier. In various implementations, the second portion of the key identifier can include the first portion of the key identifier (e.g., the portion associated with the prefix of the tree index) combined with an additional portion of the key identifier. In an illustrative example, the second hash value can be a hash of the key identifier associated with the "soft prefix" of the tree index as described above with respect to FIG. 3. The processing logic can subsequently select additional nodes in the tree traversal path using this second hash value.

Processing can then return to operation 440 to again determine whether the number of data elements that match the key identifier satisfies the threshold and repeat the above operations for any subsequent nodes in the tree structure. If at operation 460, the processing logic determines that there no additional nodes in the tree, processing proceeds to operation 480. At operation 480, processing logic can provide a response to the request without performing the cursor operation.

Figure 5:
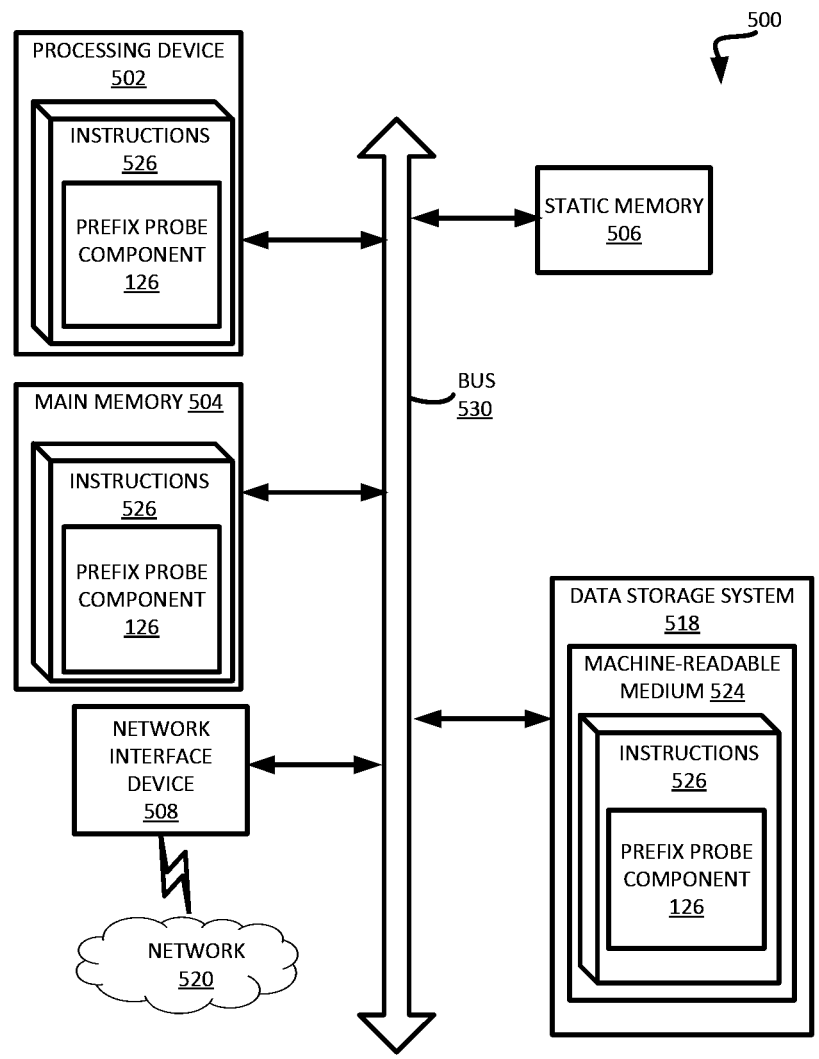
FIG. 5 is a block diagram of an example computer system in which implementations of the present disclosure can operate.

FIG. 5 illustrates an example machine of a computer system 500 within which a set of instructions, for causing the machine to perform any one or more of the methodologies discussed herein, can be executed. For example, the computer system 500 can correspond to a host system (e.g., the host system 120 of FIG. 1) that includes, is coupled to, or utilizes a memory sub-system (e.g., the host system 110 of FIG. 1) or can be used to perform the operations of a controller (e.g., to execute an operating system to perform operations corresponding to the prefix probe component 126 of FIG. 1). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device can be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520. The data storage device 518 can include a machine-readable storage medium 524 (also known as a computer-readable medium) on which is stored one or more sets of instructions or software 526 embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage device 518, and/or main memory 504 can correspond to the memory sub-system 110 of FIG. 1.

In one implementation, the instructions 526 include instructions to implement functionality corresponding to a specific component (e.g., prefix probe component 126 of FIG. 1). While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "traversing" or "determining" or "performing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus can be specially constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:

receiving, by a processing device, a request to perform a cursor operation to search for one or more data elements of a key-value data store, the request comprising a key identifier associated with the one or more data elements, and wherein the key-value data store comprises a tree structure with a plurality of nodes; and in response to receiving the request to perform the cursor operation, executing, by the processing device, a prefix probe operation for the key-value data store, wherein executing the prefix probe operation comprises:

traversing, by the processing device, a portion of the plurality of nodes to identify data elements in the key-value data store that match the key identifier;

determining, by the processing device, a total number of the data elements that match the key identifier, wherein the total number of data elements that match the key identifier is tracked using a counter, and wherein the counter is incremented in response to identifying a data element that (i) matches the key identifier, (ii) is not associated with a previously encountered data element that was deleted, and (iii) is not a duplicate of a previously encountered data element;

determining, by the processing device, whether the total number of data elements that match the key identifier is greater than or equal to a threshold number;

responsive to determining that the total number of data elements that match the key identifier is greater than or equal to the threshold number, performing, by the processing device, the cursor operation and an associated merge sort operation to generate a sorted result set for the data elements that match the key identifier across the key-value data store, wherein the sorted result set excludes any data elements that match the key identifier but that are associated with the previously encountered data element that was deleted and providing, by the processing device, the sorted result set as a response to the request; and responsive to determining that the total number of data elements that match the key identifier is not greater than or equal to the threshold number, providing, by the processing device, the response to the request without performing the cursor operation and the associated merge sort operation for the data elements that match the key identifier.

2. The method of claim 1, further comprising:

determining whether any data elements in the key-value data store match the key identifier; and responsive to determining that no data elements match the key identifier, providing the response to the request, the response indicating an end of file condition.

3. The method of claim 1, further comprising:
responsive to determining that one data element matches the key identifier, providing the response to the request, the response comprising the one data element.

4. The method of claim 1, wherein traversing the portion of the plurality of nodes comprises:
determining a first hash value of a first portion of the key identifier;
selecting a first node of the plurality of nodes based on the first hash value;
determining whether the first node comprises any data elements that match the key identifier; and
responsive to determining that the first node does not comprise any data elements that match the key identifier, selecting an additional node of the plurality of nodes.

5. The method of claim 4, further comprising:
determining whether the first node is associated with a threshold node level of the tree structure;
responsive to determining that the first node is associated with the threshold node level, determining a second hash value of a second portion of the key identifier, wherein the second portion comprises the first portion combined with an additional portion of the key identifier; and
selecting the additional node of the plurality of nodes based on the second hash value.

6. The method of claim 1, wherein performing the cursor operation comprises:
sorting the data elements that match the key identifier to generate a sorted collection of data elements;
identifying a portion of the sorted collection of data elements associated with deleted data elements; and
removing, from the sorted collection of data elements, the portion of the sorted collection associated with the deleted data elements.

7. A system comprising:
a plurality of memory components; and
a processing device, operatively coupled to the memory components, to perform operations comprising:
configuring a key-value data store in a tree structure, wherein the tree structure comprises a first set of nodes that store data based on a first hash value of a first portion of an index for the key-value data store, and a second set of nodes that store data based on a second hash value of a second portion of the index for the key-value data store;
receiving a request to perform a cursor operation to search for one or more data elements of the key-value data store, the request comprising a key identifier associated with the one or more data elements; and
in response to receiving the request to perform the cursor operation, executing, by the processing device, a prefix probe operation for the key-value data store, wherein executing the prefix probe operation comprises:
traversing a portion of the first set of nodes to identify data elements in the key-value data store that match the key identifier;
determining a total number of the data elements that match the key identifier, wherein the total number of data elements that match the key identifier is tracked using a counter, and wherein the counter is incremented in response to identifying a data element that (i) matches the key identifier, (ii) is not associated with a previously encountered data element that was deleted, and (iii) is not a duplicate of a previously encountered data element;
responsive to determining that the total number of data elements that match the key identifier is greater than or equal to a threshold number, performing the cursor operation and an associated merge sort operation to generate a sorted result set for the data elements that match the key identifier across the key-value data store, wherein the sorted result set excludes any data elements that match the key identifier but that are associated with the previously encountered data element that was deleted and providing, by the processing device, the sorted result set as a response to the request; and
responsive to determining that the total number of data elements that match the key identifier is not greater than or equal to the threshold number, providing, by the processing device, the response to the request without performing the cursor operation and the associated merge sort operation for the data elements that match the key identifier.

8. The system of claim 7, wherein the processing device is further to perform operations comprising:
responsive to determining that the total number of the data elements that match the key identifier is not greater than or equal to the threshold number:
traversing a second portion of the second set of nodes to identify data elements in the key-value data store that match the key identifier; and
responsive to determining that the total number of the data elements that match the key identifier is greater than or equal to the threshold number, performing the cursor operation for the data elements that match the key identifier.

9. The system of claim 8, wherein the processing device is further to perform operations comprising:
responsive to determining that no data elements match the key identifier, providing a response indicating an end of file condition without performing the cursor operation.

10. The system of claim 8, wherein the processing device is further to perform operations comprising:
responsive to determining that one data element matches the key identifier, providing a response comprising the one data element without performing the cursor operation.

11. The system of claim 7, wherein to traverse the first portion of the first set of nodes, the processing device is further to perform operations comprising:
determining the first hash value for a first portion of the key identifier;
selecting a first node of the first set of nodes based on the first hash value;
determining whether the first node comprises any data elements that match the key identifier; and
responsive to determining that the first node does not comprise any data elements that match the key identifier, selecting an additional node of the first set of nodes.

12. The system of claim 11, wherein to traverse the second portion of the second set of nodes, the processing device is further to perform operations comprising:
determining whether the first node is associated with a threshold node level of the tree structure;
responsive to determining that the first node is associated with the threshold node level, determining the second hash value for a second portion of the key identifier, wherein the second portion comprises the first portion combined with an additional portion of the key identifier; and selecting the additional node from the second set of nodes based on the second hash value.

13. The system of claim 7, wherein to perform the cursor operation, the processing device is further to perform operations comprising:

sorting the data elements that match the key identifier to generate a sorted collection of data elements;

identifying a portion of the sorted collection of data elements associated with deleted data elements; and removing, from the sorted collection of data elements, the portion of the sorted collection associated with the deleted data elements.

14. A non-transitory computer readable medium comprising instructions, which when executed by a processing device, cause the processing device to perform operations comprising:

receiving a request to perform a cursor operation to search for one or more data elements of a key-value data store, the request comprising a key identifier associated with the one or more data elements, and wherein the key-value data store comprises a tree structure with a plurality of nodes; and in response to receiving the request to perform the cursor operation, executing, by the processing device, a prefix probe operation for the key-value data store, wherein executing the prefix probe operation comprises:

traversing a portion of the plurality of nodes to identify data elements in the key-value data store that match the key identifier;

determining a total number of the data elements that match the key identifier, wherein the total number of data elements that match the key identifier is tracked using a counter, and wherein the counter is incremented in response to identifying a data element that (i) matches the key identifier, (ii) is not associated with a previously encountered data element that was deleted, and (iii) is not a duplicate of a previously encountered data element;

determining whether the total number of data elements that match the key identifier is greater than or equal to a threshold number; and responsive to determining that the total number of data elements that match the key identifier is greater than or equal to the threshold number, performing the cursor operation and an associated merge sort operation to generate a sorted result set for the data elements that match the key identifier across the key-value data store, wherein the sorted result set excludes any data elements that match the key identifier but that are associated with the previously encountered data element that was deleted and providing, by the processing device, the sorted result set as a response to the request; and responsive to determining that the total number of data elements that match the key identifier is not greater than or equal to the threshold number, providing, by the processing device, the response to the request without performing the cursor operation and the associated merge sort operation for the data elements that match the key identifier.

15. The non-transitory computer readable medium of claim 14, the operations further comprising:

determining whether any data elements in the key-value data store match the key identifier; and responsive to determining that no data elements match the key identifier, providing the response to the request, the response indicating an end of file condition without performing the cursor operation.

16. The non-transitory computer readable medium of claim 14, the operations further comprising:

responsive to determining that one data element matches the key identifier, providing the response to the request, the response comprising the one data element without performing the cursor operation.

17. The non-transitory computer readable medium of claim 14, wherein to perform the cursor operation, the operations further comprising:

sorting the data elements that match the key identifier to generate a sorted collection of data elements;

identifying a portion of the sorted collection of data elements associated with deleted data elements; and removing, from the sorted collection of data elements, the portion of the sorted collection associated with the deleted data elements.

* * * * *